United States Patent
Ballard et al.

(10) Patent No.: US 6,662,281 B2
(45) Date of Patent: Dec. 9, 2003

(54) REDUNDANT BACKUP DEVICE

(75) Inventors: Curtis C. Ballard, Eaton, CO (US); William Wesley Torrey, Greeley, CO (US); Michael J. Chaloner, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 49 days.

(21) Appl. No.: 09/774,974

(22) Filed: Jan. 31, 2001

(65) Prior Publication Data

US 2002/0103982 A1 Aug. 1, 2002

(51) Int. Cl.[7] .............................................. G06F 12/00
(52) U.S. Cl. ........................ 711/162; 711/161; 714/6; 360/92; 360/31
(58) Field of Search ................................ 711/162, 161; 714/6; 360/92, 31

(56) References Cited

U.S. PATENT DOCUMENTS

| | | | |
|---|---|---|---|
| 5,418,664 A | * | 5/1995 | Ostwald ....................... 360/92 |
| 5,572,659 A | * | 11/1996 | Iwasa et al. .................... 714/6 |
| 5,673,382 A | | 9/1997 | Cannon et al. |
| 6,035,412 A | * | 3/2000 | Tamer ............................ 714/6 |
| 6,304,980 B1 | * | 10/2001 | Beardsley et al. ............. 714/6 |
| 6,417,977 B1 | * | 7/2002 | Ohta et al. .................... 360/31 |

FOREIGN PATENT DOCUMENTS

| | | |
|---|---|---|
| EP | 1056011 | 11/2000 |
| WO | WO9912098 | 3/1999 |

* cited by examiner

*Primary Examiner*—Donald Sparks
*Assistant Examiner*—Mehdi Namazi (57) ABSTRACT

The present disclosure relates to a redundant back up device. Through use of the device, a method for backing up information can be performed that comprises the steps of transmitting data to be backed up to a primary backup device and to the redundant backup device, writing the transmitted data to a writing medium contained within a writing device of the primary backup device, and simultaneous to the step of writing the transmitted data to the writing medium of the primary backup device, caching the transmitted data in a data storage device of the redundant backup device. By caching the transmitted data in this manner, the data can be rewritten to the writing medium should a failure occur.

46 Claims, 11 Drawing Sheets

REDUNDANT BACKUP DEVICE

FIELD OF THE INVENTION

The present disclosure relates to a redundant backup device. More particularly, the disclosure relates to a redundant backup device that automatically preserves data written to a primary backup device, for example, a tape drive.

BACKGROUND OF THE INVENTION

Businesses, governmental agencies, learning institutions, and other such concerns typically operate a plurality of computers that are connected to each other in a network. The network users often store data on the network, for instance, on the harddrives of network servers. In addition, users also typically store data on their host computers.

Often, data stored on the network and/or the host computers is backed up periodically (e.g., once every 24 hours) to create a copy of the data to prevent it from being lost due to mechanical failure, accidental deletion, and the like, and/or to form an archive of the stored data. Normally, "backup" operations entail storing a copy of all or a portion of the data files on the network and/or host computers to a backup device such as a magnetic tape library that comprises a plurality of magnetic tape drives.

Where the network and the amount of data to be backed up is large, the backup process can be quite time consuming and can require substantial resources of a network and/or backup server. For this reason, backup operations often are conducted at night when network usage is smallest. Occasionally, malfunctions occur in the backup system that interrupt the backup process. For instance, where tape drives are used, a tape can break or become damaged so as to be rendered unusable. Alternatively, the drive in which a tape is housed can become dirty and can therefore cease to operate until cleaned. Less frequently, a tape drive can break and further backup operations cannot be carried out until the drive is replaced. In any one of these situations, human intervention is necessary to rectify the problem and reinitiate the backup process. Where the backup is performed at night, this may require a net administrator or other technician to come into the office (or other network location) during non-business hours. If such an administrator or technician does not attend to the problem, a complete backup of the network and/or host computer files may not take place. In that it often requires a relatively long period of time to complete a backup (e.g., approximately 2 to 8 hours per tape), there may not be enough time or network resources available to complete the backup operation the following day. In such instances, a complete backup is not performed and, should a network user lose data, the data may be permanently lost.

From the above, it will be appreciated that it would be desirable to have a redundant backup device that automatically rectifies backup system problems and resumes the backup operations such that a complete backup process can be completed without the need for human intervention.

SUMMARY OF THE INVENTION

The present disclosure relates to a redundant back up device. Through use of the device, a method for backing up information can be performed that comprises the steps of transmitting data to be backed up to a primary backup device and to the redundant backup device, writing the transmitted data to a writing medium contained within a writing device of the primary backup device, and simultaneous to the step of writing the transmitted data to the writing medium of the primary backup device, caching the transmitted data in a data storage device of the redundant backup device.

In one example embodiment of the invention, the system in which the redundant backup device is used comprises a backup server, a primary backup device comprising a writing device that contains a writing medium, and a redundant backup device connected to the backup server and the writing device of the primary backup device. The backup device has a data storage device that caches data transmitted from the backup server to the writing device.

The features and advantages of the invention will become apparent upon reading the following specification, when taken in conjunction with the accompanying drawings.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 1:
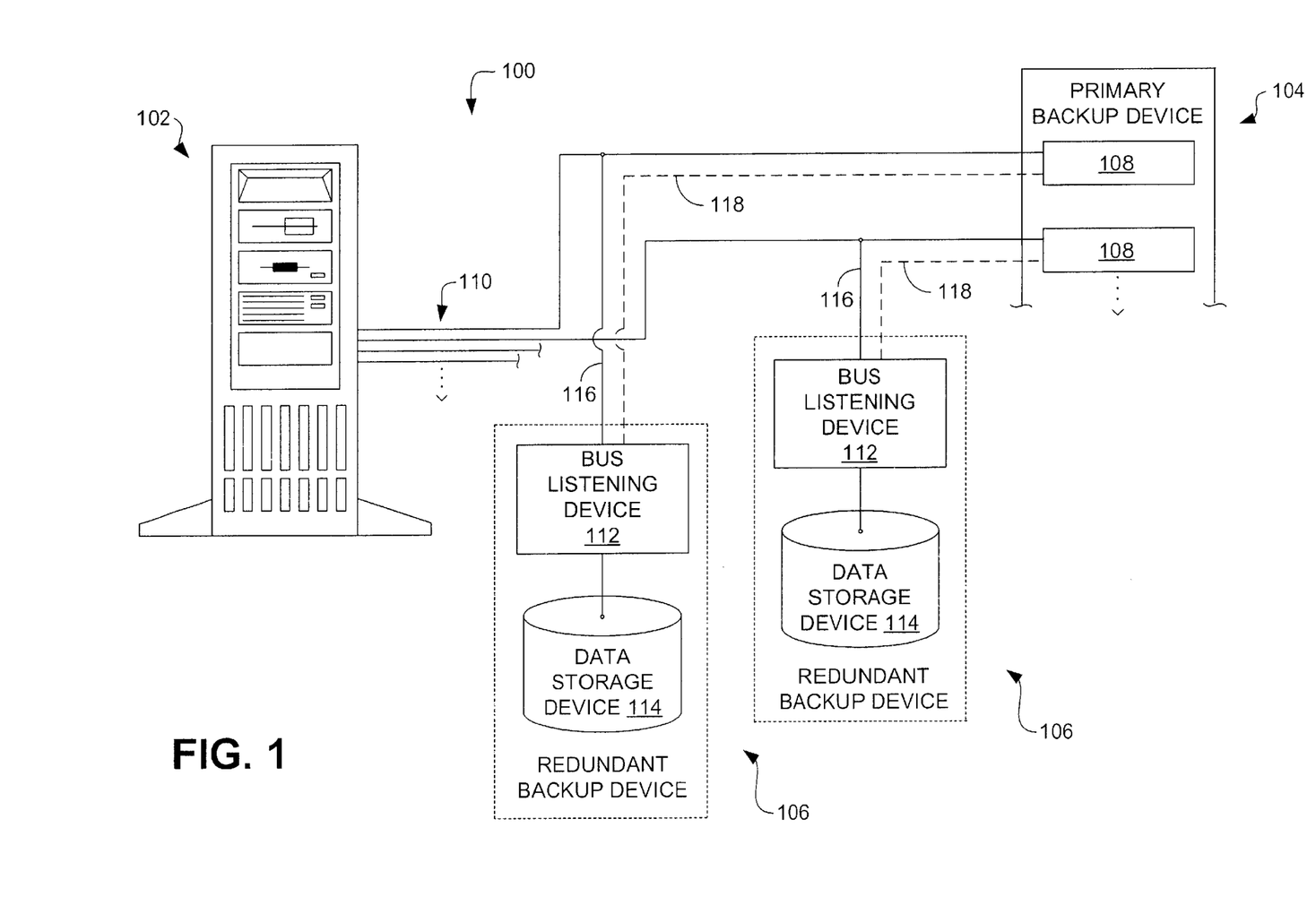
FIG. 1 illustrates a first redundant backup system of the present invention.

Referring now in more detail to the drawings, in which like numerals indicate corresponding parts throughout the several views, FIG. 1 illustrates a first redundant backup system 100 of the present invention. As shown in this figure, the backup system 100 generally comprises a backup server 102 that is connected to a network (not shown), a primary backup device 104, and one or more redundant backup devices 106. By way of example, the primary backup device 104 comprises a tape library that includes a plurality of writing devices such as magnetic tape drives 108 that receive writing media such as magnetic tapes (not shown). When comprising a tape library, the primary backup device 104 can include robotic arm or other automated mechanism with which tapes can be inserted and removed. Although described herein as comprising a tape library, the primary backup device 104 can comprise substantially any equivalent backup device used to store a copy of data stored on the network and/or in a host computer connected to the network. Therefore, the primary backup device 104 can alternatively comprise an optical storage device, non-volatile random access memory (RAM) device, or combination thereof. Similarly, the primary backup device 104 can comprise a single magnetic tape drive 108 as opposed to a tape library having a plurality of tape drives.

When the primary backup device 104 comprises one or more tape drives 108, each tape drive is capable of writing to a magnetic tape (not shown) that can be inserted into the drive. As indicated in FIG. 1, each magnetic tape drive 108 is connected to the backup server 102 with its own data bus 110. It will be understood that a single data bus could instead be used to connect the backup server 102 to two or more tape drives in alternative embodiments. As is further apparent from FIG. 1, one redundant backup device 106 is provided for each tape drive 108 of the primary backup device 104. This one-to-one ratio of redundant backup devices 106 to tape drives 108 is maintained even where a single data bus 110 is used to connect the backup server 102 to two or more tape drives.

Through the provision of the one or more data buses 110, the backup server 102 can direct data to be written by the primary backup device 104 during the backup process. In addition, the data buses 110 relay information about to the backup process occurring at the primary backup device 104 to the backup server 102. Accordingly, the backup server 102 will normally receive an error signal if a tape drive 108 of the backup device 104 is incapable of writing data to its associated tape. By way of example, information can be transmitted along the data buses 110 between the backup server 102 and the primary backup device 104 using a small computer systems interface (SCSI) protocol. Although SCSI protocol is presently envisioned, it is to be understood that alternative protocols, such as fiber channel SCSI protocol, can be used if desired.

Each redundant backup device 106 comprises a bus listening device 112 and a data storage device 114, each of which is described in greater detail below. Each bus listening device 112 is connected to its associated data bus 110 through a communication line 116. As with the data buses 110, the communication lines 116 can be used to transmit information using a SCSI or equivalent protocol. Being connected to a data bus 110, the communication line 116 can be used by the bus listening device 112 to "eavesdrop" on communications sent back and forth between the backup server 102 and each of the tape drives 108 of the primary backup device 104. Accordingly, the bus listening device 112 is capable of receiving all data transmitted to the tape drives 108 for writing and all error messages sent from the tape drives back to the backup server 102.

The data storage device 114 of each redundant backup device 106 is capable of caching the data transmitted from the backup server 102 to the one or more tape drives 108 connected to a data bus 110. Accordingly, the data storage device 114 can cache all of the data that is additionally written to the associated tape of the primary backup device 104. By way of example, the data storage device 114 can comprise one or more harddisks having a write performance that exceeds that of its associated tape drive 108. The harddisks can be arranged in a striped configuration such that a portion of the data being written to the data storage device 114 is written to each of the harddisks at any given time. Moreover, the harddisks can be arranged in a redundant array of independent disks (RAID) configuration such that caching with the data storage device 114 can still occur if one of the harddisks were to become disabled for any reason. It will be appreciated that each data storage device 114 can comprise substantially any other storage device that is capable of write performance exceeding the tape drives 108. By way of example, alternative storage devices include non-volatile RAM, rewritable optical storage, a further magnetic tape, or any combination thereof. As is further depicted in FIG. 1, the system can further include high speed communications lines 118 that directly connect the bus listening device 112 to their associated drives 108.

Figure 2:
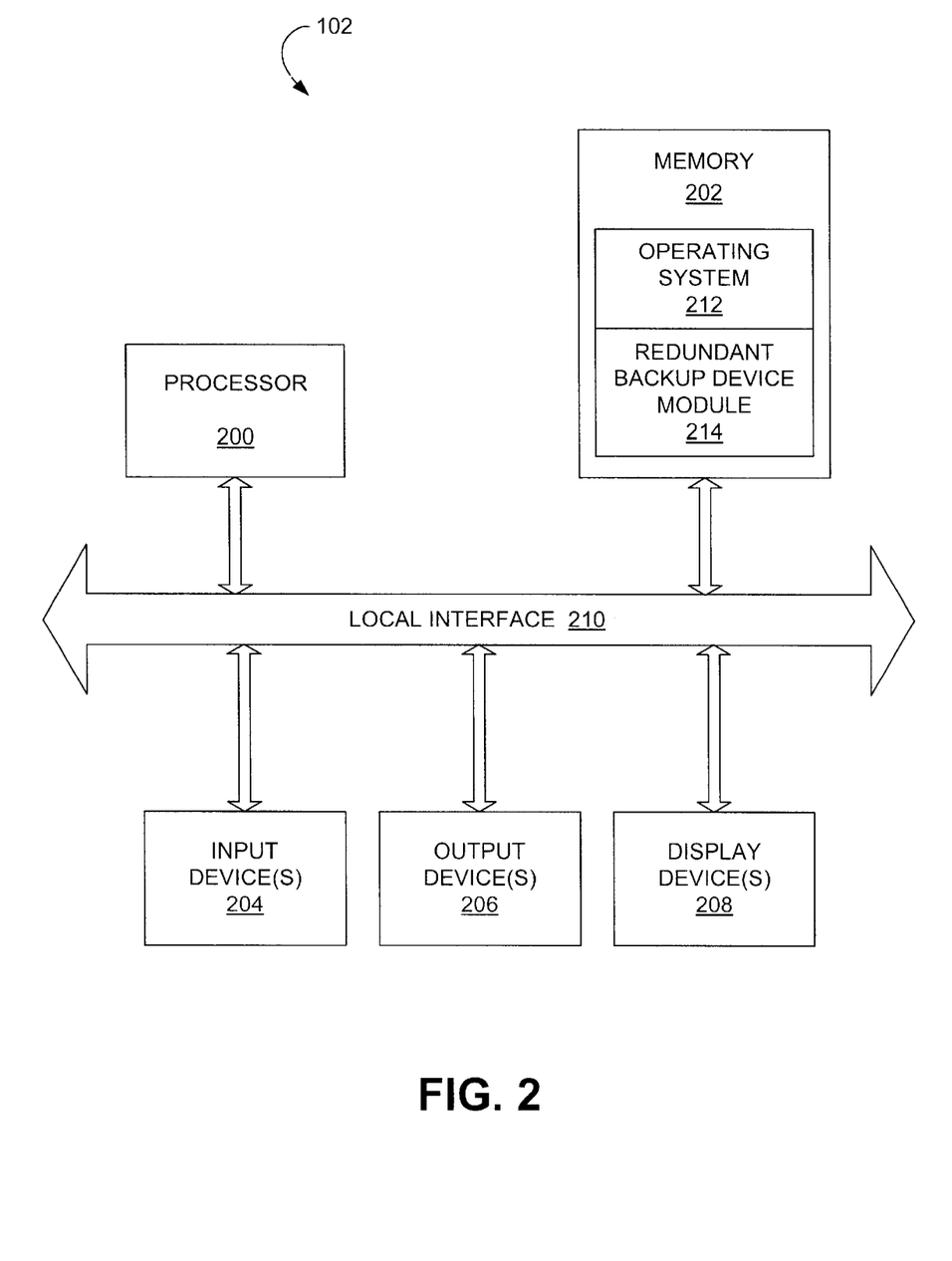
FIG. 2 illustrates a block diagram of the backup server of the system shown in FIG. 1.

FIG. 2 illustrates an example configuration of the backup server 102 shown in FIG. 1. As indicated in FIG. 2, the backup server 102 normally comprises a processor 200, a memory 202, one or more input devices 204, one or more output devices 206, and one or more display devices 208. Each of these components of the backup server 102 is connected to a local interface 210 of the backup server. Arranged in this manner, the processor 200 can direct commands to each of the other components connected to the local interface 210. In most cases, the processor 200 comprises a central processing unit (CPU) common to host devices that connect to a network. The input devices 204 may comprise standard user input devices such as a keyboard, a mouse, and various other interface components. The output devices 206 also may comprise any number of interface components, such that commands can be issued from the backup server 102 to other devices to which it is connected.

When provided, the display devices 208 may include a monitor with which a user can visually interface. As indicated in FIG. 2, the memory 202 normally includes a server operating system 212 and redundant backup device software module 214. The operating system 212 normally comprises software with which the backup server 102 is operated. The redundant backup device software module 214 normally comprises software that recognizes the presence of the redundant backup device(s) 106 and, as is discussed below, enables the backup server 102 to operate in cooperation with the redundant backup device(s) when backup operations fail.

Figure 3:
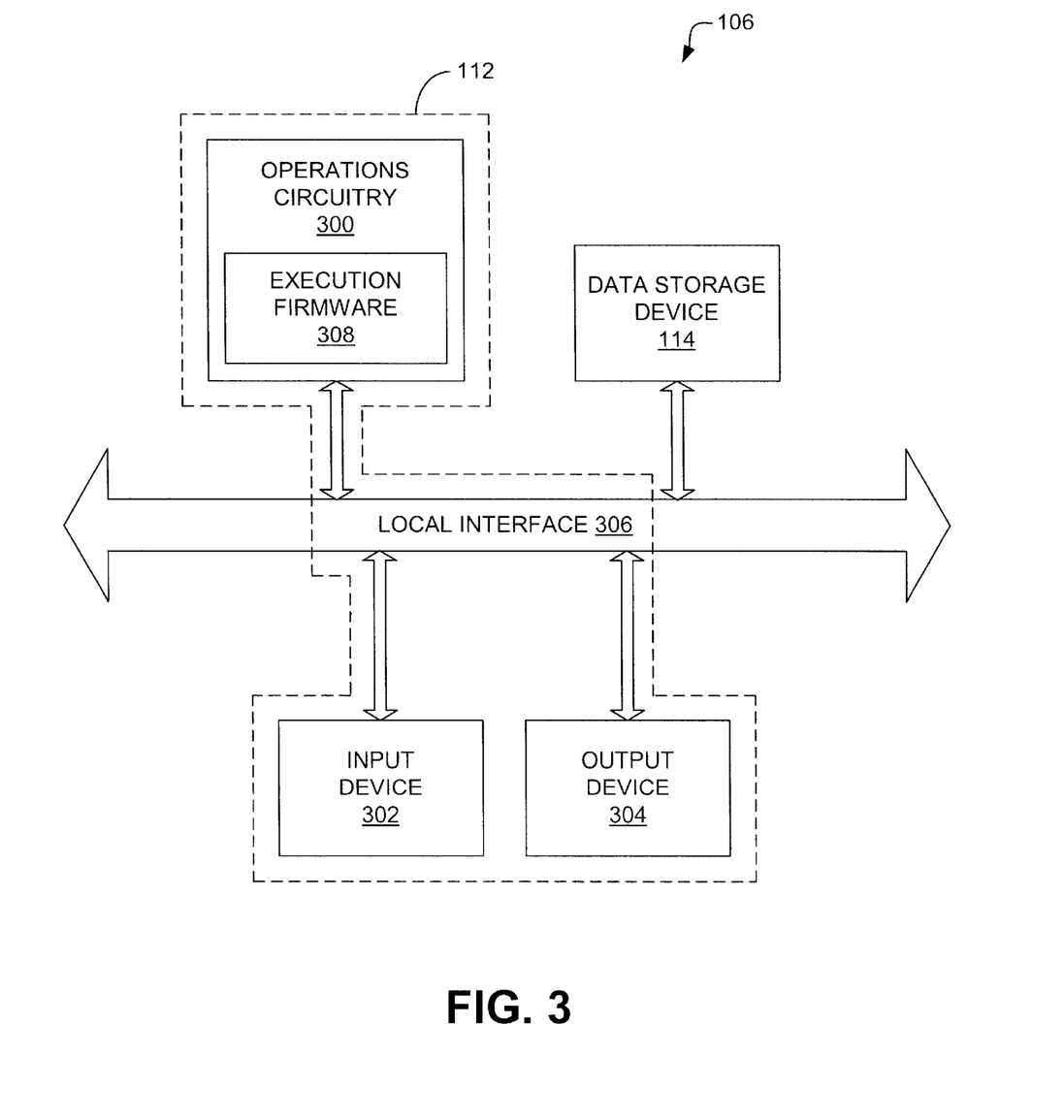
FIG. 3 illustrates a block diagram of the redundant backup device of the system shown in FIG. 1.

FIG. 3 illustrates an example configuration of a redundant backup device 106. As indicated in this figure, the bus listening device 112 includes operations circuitry 300, an input device 302, and an output device 304. The operations circuitry 300 is connected to the input device 302 and the output device 304 through a local interface 306. Through the input and output devices 302 and 304, the operations circuitry 300 is linked to its associated data bus 110 and therefore can listen to the commands and messages sent across the data bus as well as transmit data from the redundant backup device 106 to the associated tape drive 108. The operations circuitry 300 normally comprises a plurality of electrical circuits that are provided with execution firmware 308 embedded therein. With the provision of this firmware 308, the bus listening device 112 can recognize and interpret messages and/or data sent across the associated data bus 110 between the backup server 102 and the primary backup device 104. In addition, the firmware 308 enables the bus listening device 112 to transmit data from data storage device 114 (also connected to the local interface 306) to the associated tape drive 108.

Persons having ordinary skill in the art will understand that, where software or firmware is used that it can be transported on any computer readable medium for use by or in connection with an instruction execution system, apparatus, or device, such that a computer-based system, processor containing system, or other system can fetch the instructions from the instruction execution system, apparatus, or device and execute the instructions. In the context of this disclosure, a "computer readable medium" can be a means that can contain, store, communicate, propagate, or transport the program for use by or in connection with the instruction execution system, apparatus or device. A compute readable medium can be, for example, an electronic, magnetic, optical, electromagnetic, infrared, or semiconductor system, apparatus, device, or propagation medium. More specific examples of compute readable media include the following: an electrical connection having one or more wires, camera memory card, affordable computer diskette, a random access memory (RAM), a read only memory (ROM), an erasable programmable read only memory (EPROM or Flash memory), an optical fiber, and a portable compact disk read only memory (CD ROM). It is to be noted that the computer readable medium can even be paper or another suitable medium upon which the program is printed as the program can be electronically captured, via for instance optical scanning of the paper or other medium, then compiled, interpreted, or otherwise processed in a suitable manner if necessary, and then stored in a computer memory.

Figure 4A:
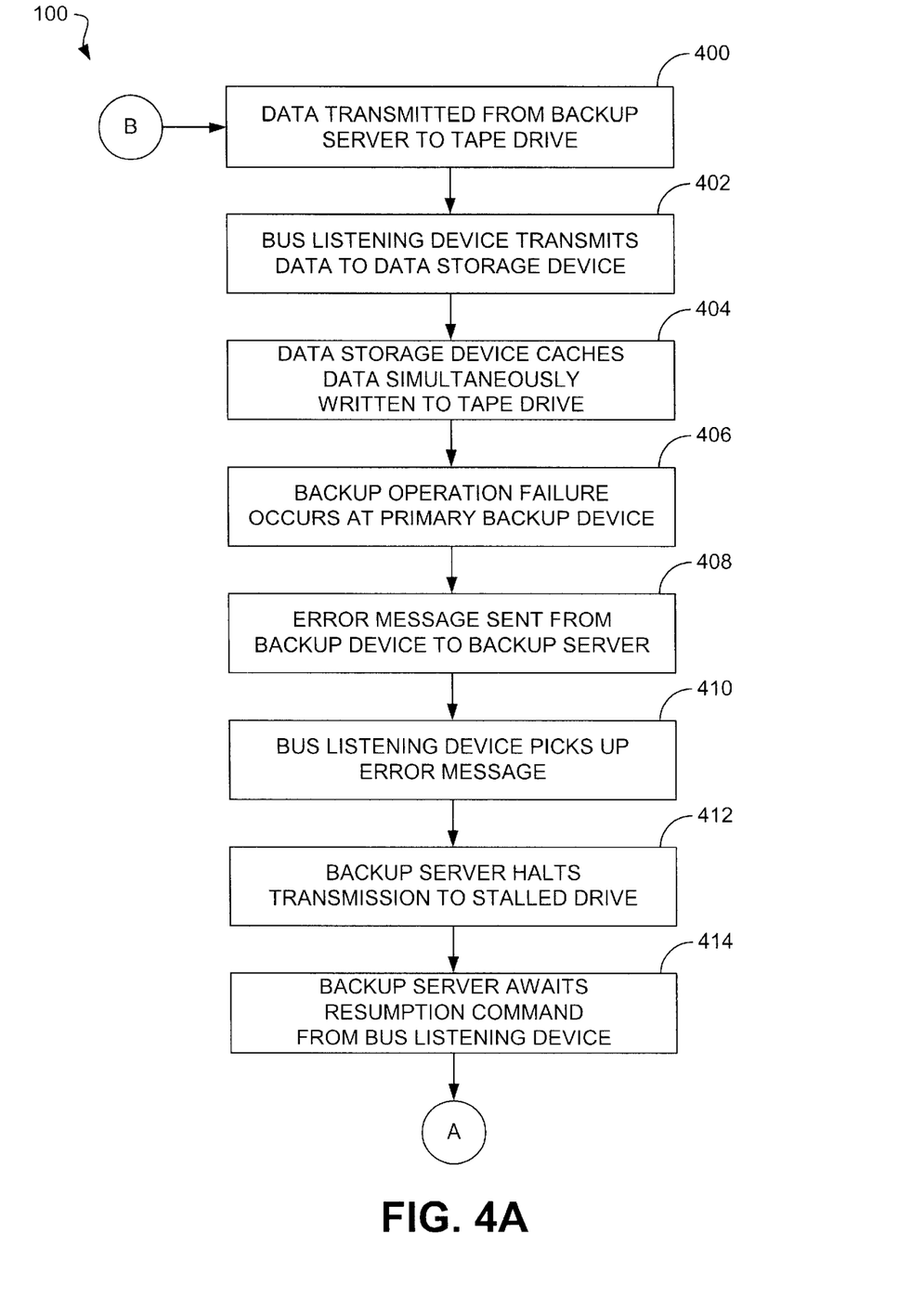
FIGS. 4A–4B illustrate a flow diagram of a method for backing up data with the system shown in FIG. 1.

FIGS. 4A–4B illustrate a flow diagram of a method for backing up data with the backup system 100. As indicated in block 400 of FIG. 4A, data is transmitted from the backup server 102 across the data buses 110 to the various tape drives 108 of the primary backup device 104. This data can comprise data that has been stored on a network server, data that has been stored on a host computer connected to the network, and any other such data that may be accessible on the network. During this transfer of data, the bus listening device 112 associated with each data bus 110 listens to all write commands transferred to the tape drives 108 and, as indicated in block 402, transmits this data to its associated data storage device 114. The data can therefore be additionally written (i.e., cached) to the data storage device 114, as indicated in block 404, such that a second copy of the data is made during the backup process. When a backup process failure occurs at a tape drive 108, as indicated in block 406, one or more error messages are sent from the tape drive experiencing the failure along its data bus 110 to the backup server 102, as identified in block 408. In that the bus listening device 112 is connected to the data bus 110, the bus listening device receives these error messages and, due to the provision of the bus listening device execution firmware 308, will recognize that a failure of its associated tape drive has occurred, as indicated in block 410. At this point, both the backup server 102 and bus listening device 112 note the break point at which failure occurred.

Once the backup server 102 receives the error messages from the primary backup device 104, the server halts further write commands to the stalled tape drive 108 as indicated in block 412. At this point, the backup server 102 will await a resumption command from the bus listening device 112, as indicated in block 414, before resuming the backup operation. The backup server 102 knows to await this resumption command due to the redundant backup device module 214 that is stored in its memory 202 as shown in FIG. 2. As discussed below, this interruption of the backup process permits the redundant backup device 106 to rewrite lost information to the associated tape, if necessary.

The nature of the recovery from the backup process failure depends upon the type of failure that has occurred. If, for example, the failure is due to failure of the tape itself, as indicated decision element 416 in FIG. 4B, flow continues to block 418 where the primary backup device 104 changes the tape located in the stalled tape drive. Normally, the changing of the tape is accomplished with the robotic arm or other mechanism provided on the primary backup device 104 such that the faulty tape can be withdrawn from the tape drive 108, set aside for disposal, and a new tape selected and inserted back into the tape drive. Once the new tape has been inserted into the tape drive 108, it is verified by the primary backup device 104, as indicated in block 416, to ensure that the tape is in fact a new tape and that it is in proper working order.

Figure 4B:
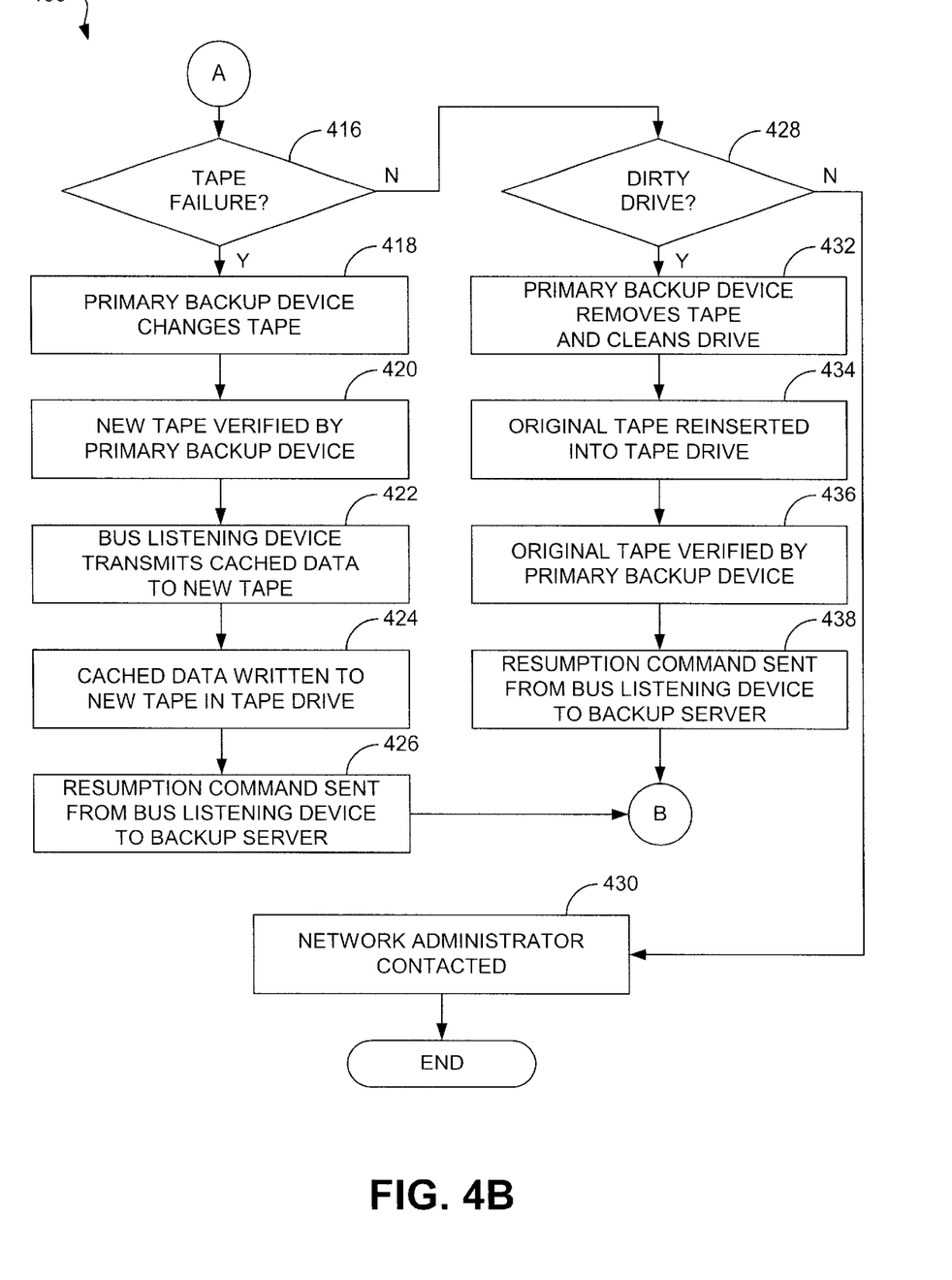

At this point, the bus listening device 112 transmits the data that has been cached in the data storage device 114 prior to the failure to the new tape that has been inserted into the tape drive 108. This data can be transmitted to the tape through the communications line 116 connected to the data bus 110 or, alternatively, the data can be transmitted to the tape via the high speed communications line 118 that directly connects the redundant backup device 106 to the tape drive 108. Where the failure occurred due to a faulty tape, the rewriting process entails transmitting all of the data previously written to the original tape up to the point of failure to the new tape. Where the data bus 110 is used for the transmission of this data, the rewriting process normally will require as much time as the original writing process had taken prior to failure. Alternatively, where the high speed communications line 118 to transmit the cached data to the tape drive 108, the rewriting process can be accomplished more quickly if the tape drive 108 is capable of more rapid writing operations than its data bus 110 would permit. Even where the data bus 110 is relied upon to transmit the cached data to the tape drive 108, advantageous results are obtained in that the resources of the backup server 102 and/or any host computers that had participated in the backup up to the point of failure are not required to recapture the previously written data. Accordingly, the resources of the backup server 102 and the host computers can be utilized for other purposes.

The cached data is written to the new tape in the same manner as the original data had been written as described above, as indicated in block 424. Once the restoration process has continued to the point where the failure occurred, the bus listening device 112 sends a resumption command to the backup server 102, as indicated in block 426, to instruct the backup server to continue the backup operation from the point where it had left off. At this point, flow returns back to block 400 where data is transmitted to the tape drive 108 from the backup server 102 so that the backup process can be completed. It is to be noted that, if no backup failure occurs with a particular tape or tape drive, the data cached by the redundant backup device 106 is dumped by the device once its associated tape has been successfully filled. Operating in this manner, the redundant backup device 106 will be prepared to cache data written to a new tape once the new tape is inserted into its associated tape drive 108. Accordingly, the redundant backup device 106 is used to continually copy data sent to its associated tape drive 108 to ensure that all data that is backed up with the backup system 100 is preserved.

Returning to decision element 416, if it is not the tape that has failed, flow continues to decision element 428 where it is determined whether the failure occurred due to a dirty drive. If the failure is not due to a dirty drive or a faulty tape, the problem associated with the backup device 104 most likely is one that cannot be automatically remedied by the first backup system 100. Accordingly, flow continues to block 430 at which point a network administrator or other technician is contacted in the conventional manner to service the backup system 100. If, on the other hand, the drive is dirty, flow continues to block 432 where the primary backup device 104 removes the operable tape and cleans the dirty drive 108. Normally, cleaning of the drive 108 can be accomplished by simply inserting a cleaning tape into the drive and "playing" the tape for a predetermined duration of time.

Once the tape drive 108 has been properly cleaned, the original tape can be reinserted into the drive, as indicated in block 434. At this point, the original tape is verified by the primary backup device 104, as indicated in block 436, to ensure that the correct tape has been reinserted back into the drive. Upon verification, the primary backup device 104 issues a message to the backup server 102, and thereby also to the bus listening device 112, to notify the backup server that the tape drive 108 is again prepared to write data to its tape. At this point, the bus listening device 112 sends a resumption command to the backup server 102 along the data bus 110, as indicated in block 438. The backup server 102 can then resume the backup process and transmit data to the tape drive 108 as indicated in block 400. It is to be noted that, in the situation where the tape drive is dirty, the caching feature of the data storage device 114 is not necessarily utilized. However, the redundant backup device 106 can be relied upon to provide the missing or corrupted data prior to the resumption of the backup operation by the backup server 102, if needed.

Figure 5:
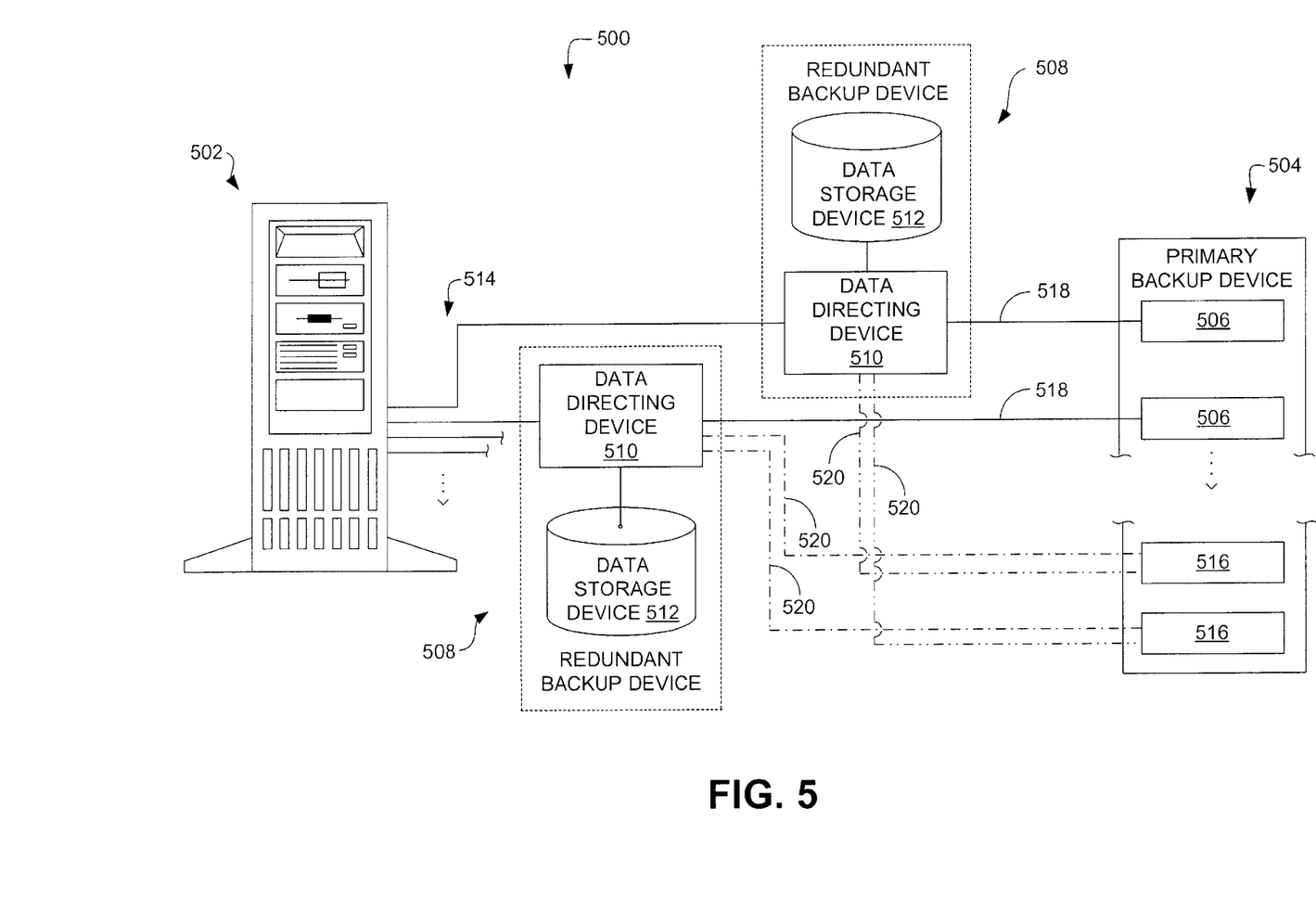
FIG. 5 illustrates a second redundant backup system of the present invention.

FIG. 5 illustrates a second redundant backup system 500 of the present invention. As is evident from this figure, the second backup system 500 is similar to the first backup system 100. Accordingly, the second backup system 500 includes a backup server 502 and a primary backup device 504 that normally comprises a tape library that includes a plurality of tape drives 506. In addition, the second backup system 500 further includes a redundant backup device 508 for each of the tape drives 506 of the primary backup device 504. However, the redundant backup devices 508 of the second backup system 500 have a configuration alternative to that of the redundant backup devices 106 shown in FIG. 1. In particular, the redundant backup devices 508 comprise data directing devices 510 and data storage devices 512. The configuration of the data storage devices 512 is similar to those of the data storage devices 114 shown in FIG. 1 and therefore will not be described in detail again. The data directing devices 510 are likewise similar in construction to the bus listening device 112, however, do not merely listen to commands and messages transmitted along the data buses 514 that link the backup server 502 to the tape drives 506. Instead, as described below, the data directing devices 510, intercept these commands and messages such that the data directing devices can manipulate the operations of the backup server 502 and the primary backup device 504.

Unlike the first backup system 100, the second backup system 500 includes auxiliary tape drives 516. Typically, the auxiliary tape drives 516 comprise inactive drives of the primary backup device 504, although it will be understood that they could comprise part of an auxiliary backup device. The auxiliary tape drives 516 are used as a failsafe should a tape drive 506 of the primary backup device 504 fail. As is further indicated in FIG. 5, the redundant backup devices 508 directly connect the backup server 502 to the data buses 514 and to a tape drive 506 of the primary backup device 504 with a high speed communications line 518. Each of the redundant backup devices 508 also connects to each of the auxiliary tape drives 516. Being connected in this manner, each of the redundant backup devices 508 can access each of the auxiliary tape drives 516 should a drive failure occur at the primary backup device 504.

Like the bus listening device 112, the data directing device 510 is similarly provided with operations circuitry and firmware that enables it to cache data to the data storage device 512 that is transmitted from the backup server 502 to the primary backup device 504. In addition, however, the data directing device 510 is responsible for transmitting this data to its associated tape drive 506. Accordingly, as in the first embodiment, the data transmitted from the backup server 502 is copied to both the data storage device 512 and to the tape drive 506. However, since the data directing device 510 is placed in between the backup server 502 and the primary backup device 504, the data directing device is responsible for sending any commands or messages to and from the backup server and primary backup device. Therefore, the redundant backup device 508 has an additional measure of control over the backup process executed by the second backup system 500.

The data directing device 510 can be configured to mimic the primary backup device 504 such that the backup server 502 is not aware of the presence of the redundant backup device 508 and instead interprets messages received from the data directing device as coming directly from the primary backup device 504. With such a configuration, the backup server 502 need not be provided with software to recognize the redundant backup device 508. Accordingly, the second backup system 500 provides the additional advantage of not requiring additional software or modification of the backup server 502. When a failure occurs at the primary backup device 504, the data directing device 510 can determine not to inform the backup server 502 of the problem. In such a situation, the backup server 502 will continue to transmit data to be backed up. During this time, the redundant backup device 508 can cache the transmitted data into its data storage device 512 such that this information is not lost. Once the problem has been rectified, the redundant backup device 508 can rewrite information that has been cached in the data storage device 512 to the again functional tape drive 506 simultaneous to caching new data from the backup server 502. To better facilitate this simultaneous reading and writing, it is particularly advantageous for the redundant backup device 508 to have a reading and writing performance level which enables it to both read and write data as quickly as its associated tape drive 506 can write data. With such an arrangement, time can be saved in that recovery of the lost information occurs simultaneously to the continued backup operation.

FIGS. 6A–6D illustrate a flow diagram for backing up data using the second backup system 500 shown in FIG. 5. As indicated in block 600 of FIG. 6A, data is first transmitted from the backup server 502 to each of the redundant backup devices 508 along the data buses 514 connected to the backup server. The data directing devices 510 transmit the data to the data storage devices 512 and the tape drives 506 of the primary backup device 504 substantially simultaneously, as indicated in block 602. The data storage devices 508 cache the data while the tape drives 506 write to their various tapes, as indicated in block 604.

Upon a backup operation failure that occurs at the primary backup device (block 606), an error message is sent from the tape drive 506 experiencing the failure to the data directing device 510, as indicated in block 608. The data directing device 510 then halts further writing commands to the failed tape drive 506, as indicated in block 610, to ensure that no data is lost while the problem is being rectified. As indicated at decision element 612, it is determined whether the failure is due to a faulty tape. If the tape itself has failed, flow continues to block 614 in FIG. 6B at which point, as in the first embodiment, the primary backup device 504 changes the tape and inserts a new tape within the tape drive. The new tape is verified by the primary backup device 504, as indicated in block 616, to ensure that it is empty and fully functional. The data directing device 510 then transmits the cached data to the new tape residing in the tape drive 506, as indicated in block 618. During this time period, the data directing device 510 continues to transmit data from the backup server 502 to the data storage device 512. Accordingly, despite the interruption that occurred due to the failure of the tape, the backup server 502 continues to execute the backup process. Therefore, the backup server 502 normally will not be required to operate any longer than it would have had the failure not occurred. The redundant backup device 508 continues to transmit the cached data to the tape drive 506 until it fills the tape within the drive with the data, as indicated at 622. Returning to block 600 in FIG. 6A, data continues to be transmitted from the backup server 502 to the data directing device 510 as described above and will continue to be until all of the data to be backed up is transmitted by the backup server 502 to the data directing devices 510.

Figure 6A:
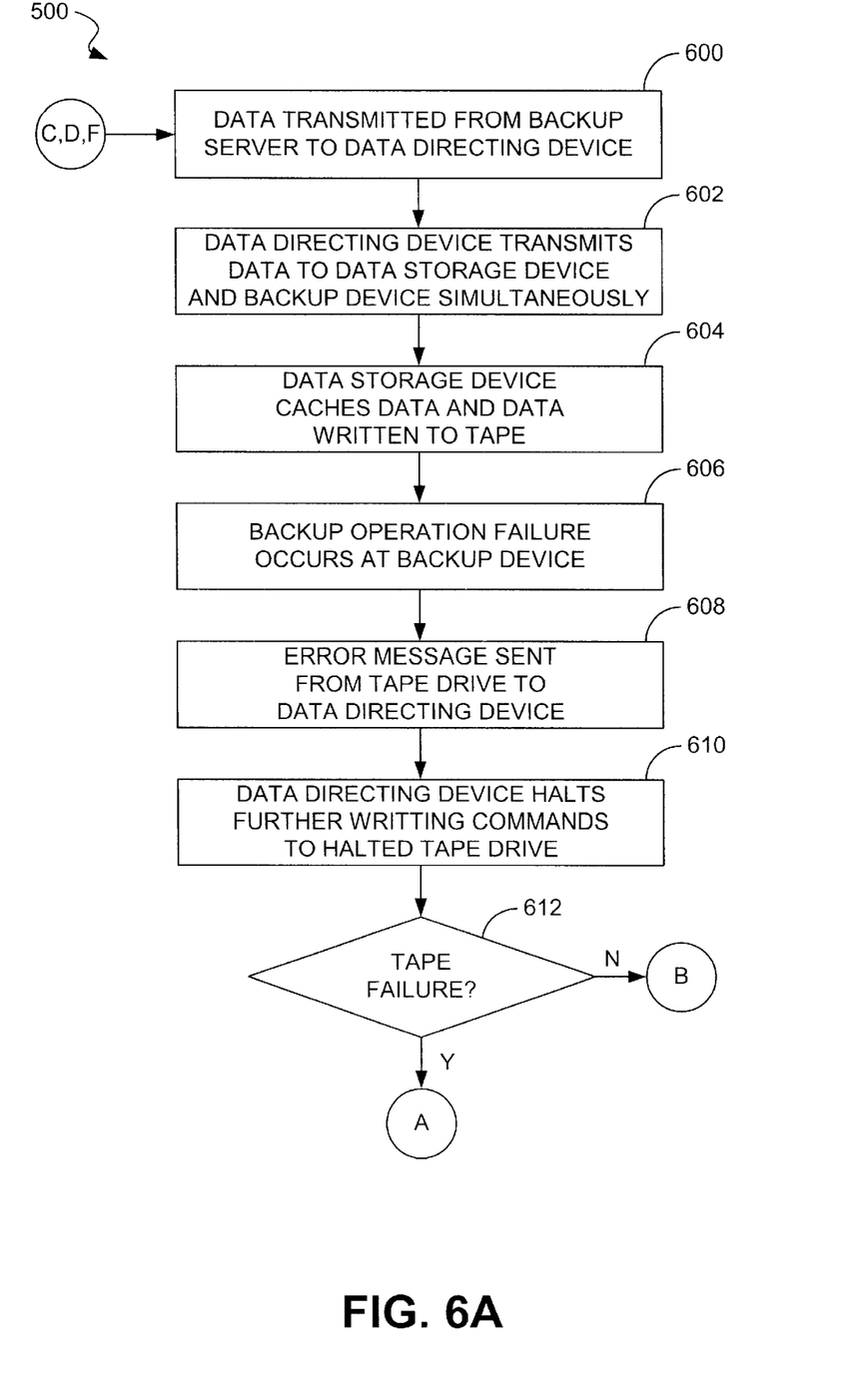
FIGS. 6A–6D illustrate a flow diagram of a method for backing up data with the system shown in FIG. 5.
Figure 6B:
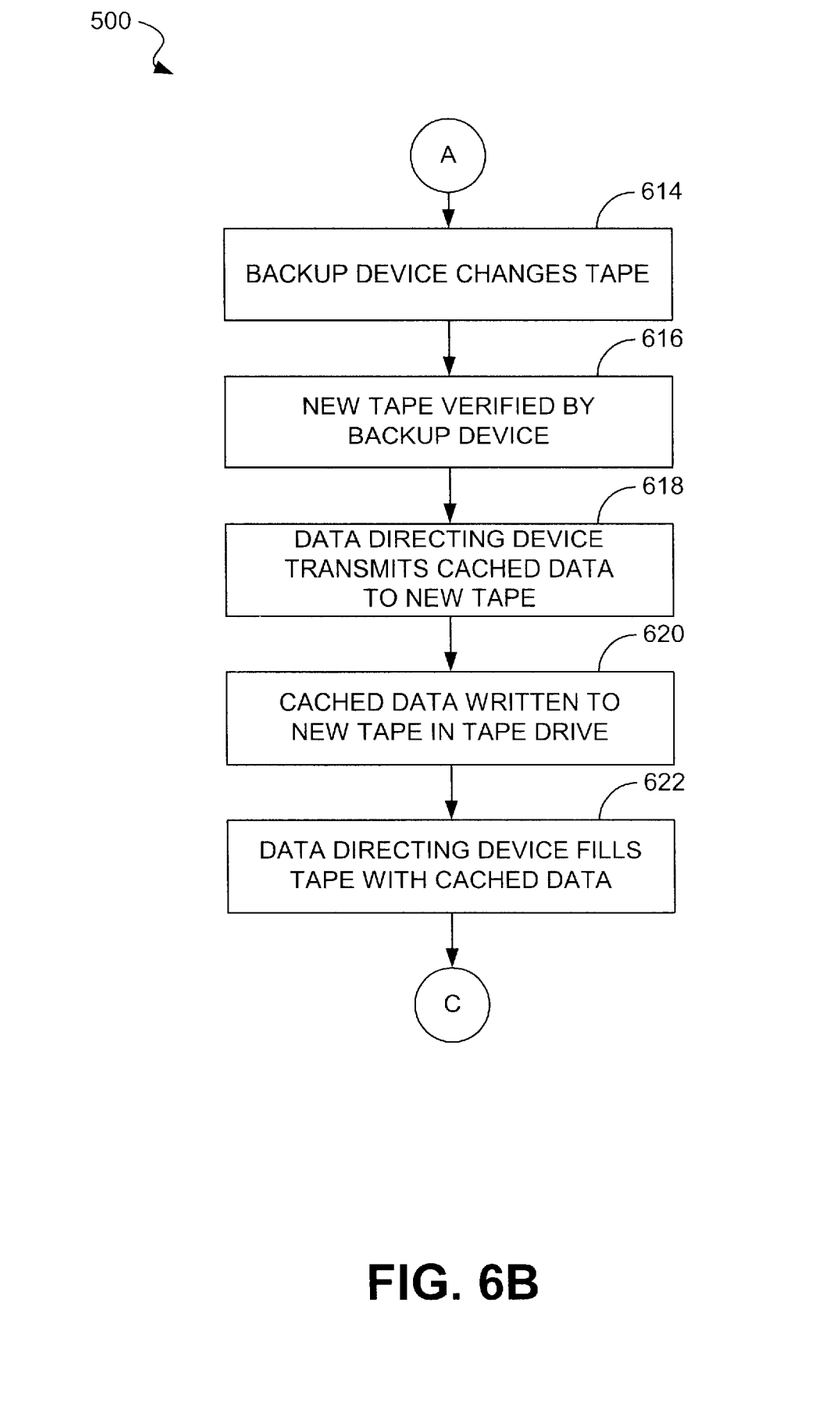
Figure 6C:
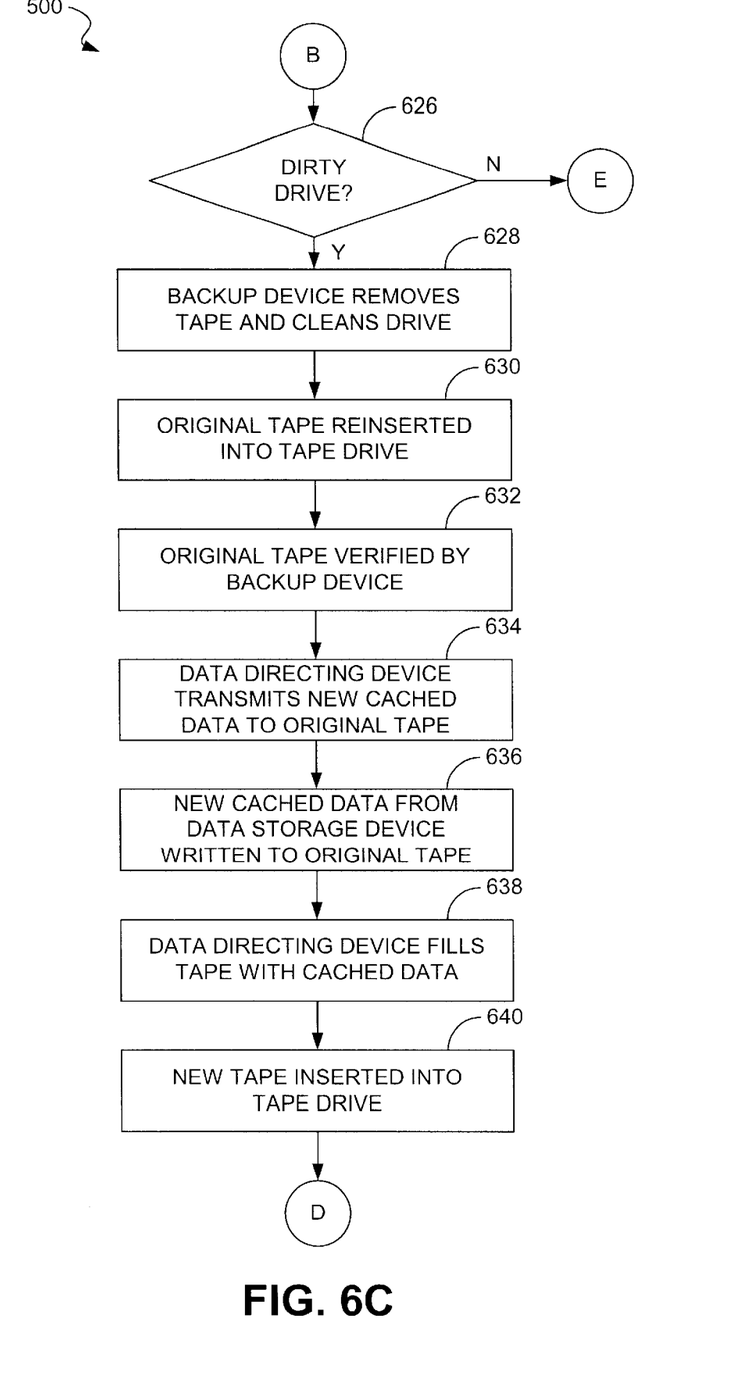

Returning to decision element 612 in FIG. 6A, if the failure is not due to a faulty tape, flow continues to decision element 626 in FIG. 6C. At this point, it is determined whether the failure is due to a dirty drive. If so, flow continues to block 628 where the primary backup device 504 removes the tape and cleans the dirty drive. After the drive has been cleaned, the original tape is reinserted into the tape drive, as indicated in block 630, and the original tape is verified by the backup device as indicated in block 632. Once more, the data directing device 510 associated with the cleaned tape drive 506 transmits any data that had been cached while the tape drive was off-line. This new cached data is written to the original tape beginning from the place where the original write was terminated, as indicated in block 636. The data directing device 510 continues to transmit data to the tape drive 506 until it fills the tape with the cached data as indicated in block 638. As before, if there is more information to be backed up by the tape drive 506, the primary backup device 504 will insert the new tape for writing the further data, as indicated in block 640. Again, returning to block 600, the backup server 502 continues to transmit data along the data buses 514 until all of the data to be backed up has been transmitted.

Figure 6D:
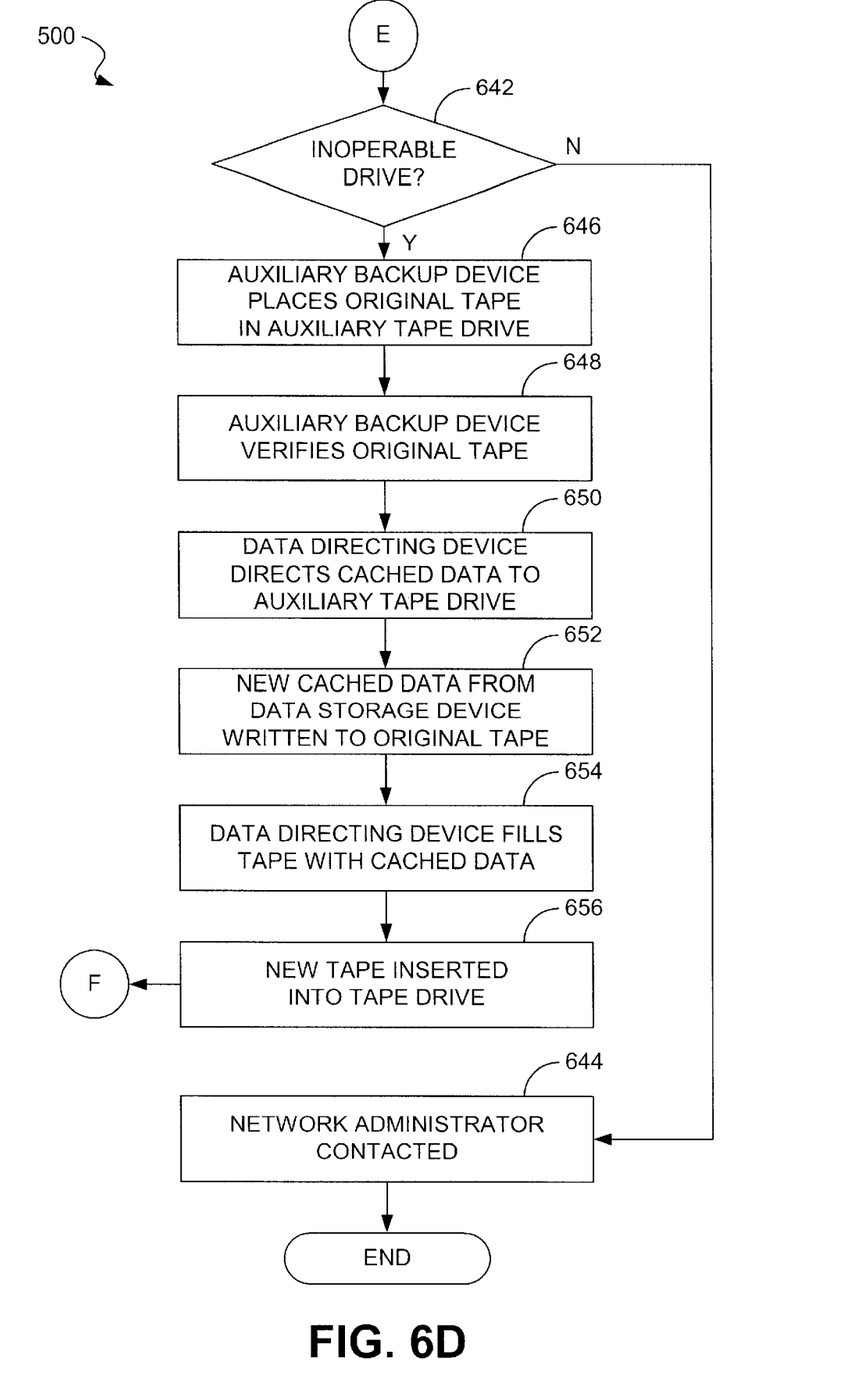

Returning to FIG. 6C and decision element 626, if the drive is not dirty and if the tape is not faulty, flow continues to decision element 642 in FIG. 6D. As indicated there, it is determined whether the drive itself is inoperable. If not, the drive failure is of the type that cannot likely be fixed automatically by the backup system 500. Accordingly, flow continues down to block 644 and a network administrator or other technician is contacted. Alternatively, if it is determined that the drive is not working, flow continues to block 646 at which point the primary backup device 504 removes the original tape from its drive 506 and places the tape in one of the auxiliary tape drives 516, as indicated in block 646. The primary backup device 504 ensures that the tape is the original tape that had previously been written to, as indicated in block 648. Once the verification has been completed, the data directing device 510 redirects the cached data to the auxiliary tape drive 516 along one of the auxiliary communication lines 520 shown in FIG. 5. Accordingly, the data cached during the interim will be transmitted to the original tape residing in the auxiliary tape drive 516 such that the backup to that tape can be resumed from the point at which the failure occurred. The data directing device 510 continues to transmit data to the tape until the device fills the tape, as indicated in block 654. As before, if there was additional information to be written, a new tape will be inserted in the auxiliary tape drive 516, as indicated in block 656, and the backup operation will continue with reference back to block 600 in FIG. 6A.

Figure 7:
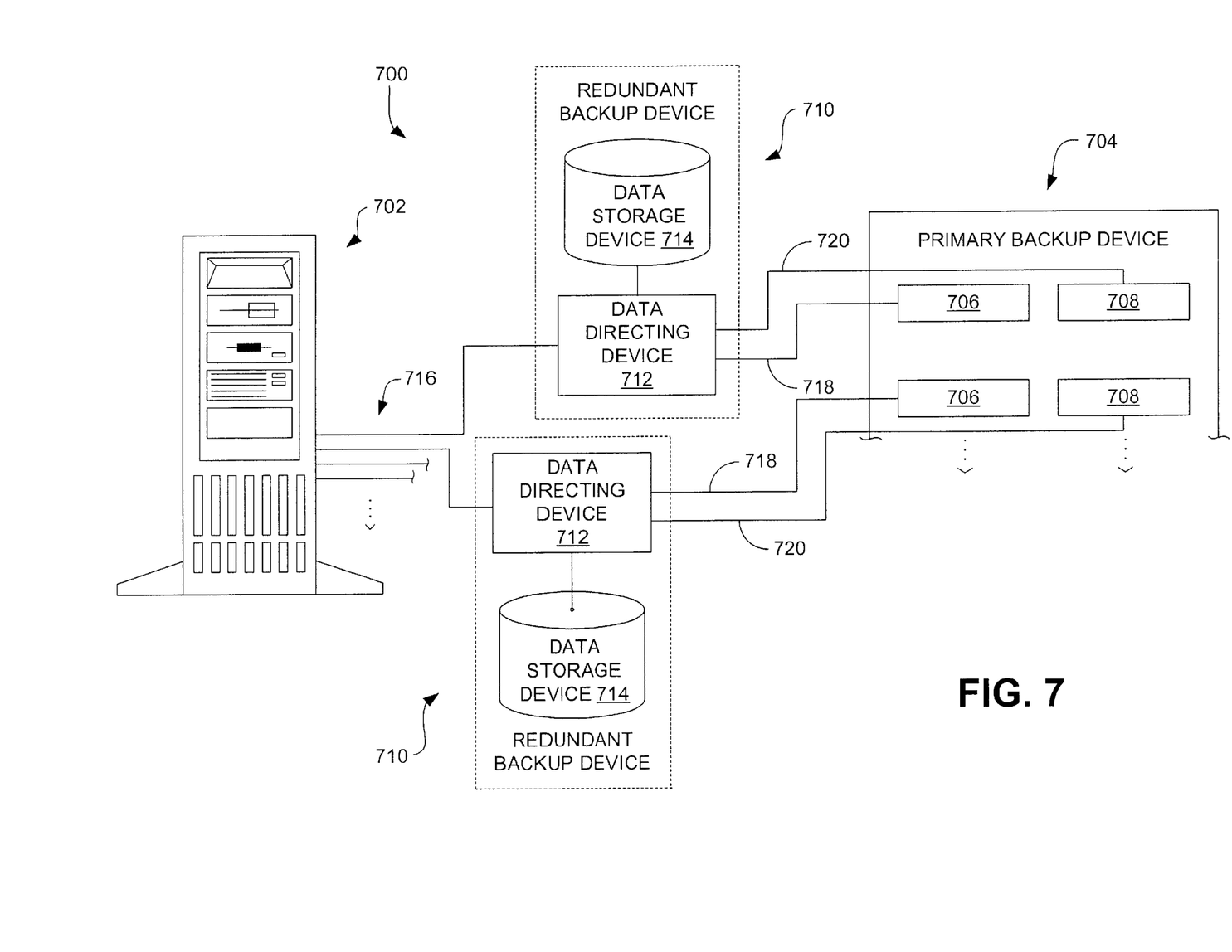
FIG. 7 illustrates a third backup system of the present invention.

FIG. 7 illustrates a third backup system 700 of the present invention. This backup system 700 is similar to that shown in FIG. 5. Accordingly, a detailed description of the backup system 700 shown in FIG. 7 will not be provided. Generally speaking, however, the third backup system 700 comprises a backup server 702 connected to the network (not shown), a primary backup device 704 which comprises a plurality of tape drives 706, and one redundant backup device 710 provided for each of the tape drives 706. As in the second embodiment, the redundant backup devices 710 each comprise a data directing device 712 having operation circuitry and execution firmware, and a data storage device 714 capable of caching data transmitted by the backup server 702 along one of several data buses 716. This data can also be transmitted by the data directing device 710 along a communication line 718 directly to the associated tape drive 706.

As indicated in FIG. 7, the primary backup device 704 further includes an auxiliary tape drive 708 for each of the primary tape drives 706. As indicated in the figure, the auxiliary tape drives 708 are connected to the data directing device 712 through a communication line 720. Accordingly, the embodiment illustrated in FIG. 7 differs from the embodiment illustrated in FIG. 5 only in that one auxiliary drive 708 is provided for each primary drive 706, such that an ample supply of backup tape drives are available. Accordingly, the backup system 700 shown in FIG. 7 is used in similar manner to the backup system 500 illustrated in FIG. 5 except for the fact that, upon failure of a tape drive 706, data is directed to its associated backup tape drive 708 instead of to an auxiliary tape library.

While particular embodiments of the invention have been disclosed in detail in the foregoing description and drawings for purposes of example, it will be understood by those skilled in the art that variations and modifications thereof can be made without departing from the scope of the invention as set forth in the following claims.

What is claimed is:

1. A method for backing up information, comprising:
   transmitting data to be backed up to a primary backup device and a redundant backup device;
   writing the transmitted data to a first writing medium contained within a writing device of the primary backup device;
   substantially simultaneous to the step of writing the transmitted data to the first writing medium of the primary backup device, caching the transmitted data in a data storage device of the redundant backup device;
   interrupting transmission of data to the first writing device upon a backup operation failure;
   automatically replacing the first writing medium with a new writing medium; and
   transmitting the data previously written to the first writing medium to the new writing medium from the data storage device of the redundant storage device.

2. The method of claim 1, wherein the primary backup device is a tape library, the writing device is a tape drive, and the writing media are tapes.

3. The method of claim 1, further comprising the step of preventing new data from being transmitted to the new writing medium until the previously written data has been written to the new writing medium.

4. The method of claim 1, wherein one redundant backup device is provided for each writing device of the primary backup device.

5. The method of claim 4, wherein the redundant backup device and its associated writing device are connected to a common data bus over which the transmitted data travels.

6. The method of claim 1, further comprising interrupting transmission of data to the redundant backup device upon a backup operation failure.

7. The method of claim 1, further comprising caching new data in the data storage device of the redundant backup device substantially simultaneously to transmitting cached data to the first writing medium.

8. A method for backing up information, comprising:
transmitting data to be backed up to a primary backup device and a redundant backup device;
writing the transmitted data to a writing medium contained within a writing device of the primary backup device;
substantially simultaneous to the step of writing the transmitted data to the writing medium of the primary backup device, caching the transmitted data in a data storage device of the redundant backup device;
interrupting transmission of data to the writing device upon a backup operation failure;
automatically removing the writing medium;
cleaning the writing device;
automatically replacing the writing medium; and
resuming the transmission of data to the primary backup device.

9. The method of claim 8, wherein the primary backup device is a tape library, the writing device is a tape drive, and the writing medium is a tape.

10. The method of claim 8, further comprising interrupting transmission of data to the redundant backup device upon a backup operation failure.

11. The method of claim 8, further comprising caching new data in the data storage device of the redundant backup device substantially simultaneously to transmitting cached data to the writing medium.

12. The method of claim 8, wherein one redundant backup device is provided for each writing device of the primary backup device.

13. The method of claim 12, wherein the redundant backup device and its associated writing device are connected to a common data bus over which the transmitted data travels.

14. A method for backing up information, comprising:
transmitting data to be backed up to a primary backup device and a redundant backup device;
writing the transmitted data to a writing medium contained within a writing device of the primary backup device;
substantially simultaneous to the step of writing the transmitted data to the writing medium of the primary backup device, caching the transmitted data in a data storage device of the redundant backup device;
interrupting transmission of data to the writing device upon a backup operation failure;
automatically removing the writing medium from the writing device;
automatically placing the writing medium in an auxiliary writing device; and
transmitting data to the writing medium that was cached by the data storage device of the redundant backup device while the writing medium was being moved to the auxiliary writing device.

15. The method of claim 14, further comprising the step of caching new data in the data storage device of the redundant backup device substantially simultaneously to transmitting cached data to the writing medium.

16. The method of claim 14, wherein the primary backup device is a tape library, the writing device is a tape drive, and the writing medium is a tape.

17. The method of claim 14, further comprising interrupting transmission of data to the redundant backup device upon a backup operation failure.

18. The method of claim 14, wherein one redundant backup device is provided for each writing device of the primary backup device.

19. The method of claim 18, wherein the redundant backup device and its associated writing device are connected to a common data bus over which the transmitted data travels.

20. A system for backing up information, comprising:
means for transmitting data to be backed up to a primary backup device and a redundant backup device;
means for writing the transmitted data to a first writing medium contained within a writing device of the primary backup device;
means for caching the transmitted data in a data storage device of the redundant backup device simultaneous to writing the transmitted data to the first writing medium of the primary backup device;
means for interrupting transmission of data to the writing device;
means for automatically replacing the first writing medium with a new writing medium; and
means for transmitting the data previously written to the first writing medium to the new writing medium from the data storage device of the redundant storage device.

21. The system of claim 20, wherein one redundant backup device is provided for each writing device of the primary backup device.

22. The system of claim 20, wherein the redundant backup device and its associated writing device are connected to a common data bus over which the transmitted data travels.

23. The system of claim 20, wherein one redundant backup device is provided for each writing device of the primary backup device.

24. The system of claim 23, wherein the redundant backup device and its associated writing device are connected to a common data bus over which the transmitted data travels.

25. A system for backing up information, comprising:
means for transmitting data to be backed up to a primary backup device and a redundant backup device;
means for writing the transmitted data to a writing medium contained within a writing device of the primary backup device;
means for caching the transmitted data in a data storage device of the redundant backup device simultaneous to writing the transmitted data to the writing medium of the primary backup device;
means for interrupting transmission of data to the writing device;
means for automatically removing the writing medium;
means for cleaning the writing device;
means for automatically replacing the writing medium; and
means for resuming the transmission of data to the primary backup device.

26. The system of claim 25, wherein one redundant backup device is provided for each writing device of the primary backup device.

27. The system of claim 26, wherein the redundant backup device and its associated writing device are connected to a common data bus over which the transmitted data travels.

28. A system for backing up information, comprising:
means for transmitting data to be backed up to a primary backup device and a redundant backup device;
means for writing the transmitted data to a writing medium contained within a writing device of the primary backup device;

means for caching the transmitted data in a data storage device of the redundant backup device simultaneous to writing the transmitted data to the writing medium of the primary backup device;

means for interrupting transmission of data to the writing device;

means for automatically removing the writing medium from the writing device;

means for automatically placing the writing medium in an auxiliary writing device; and means for transmitting data to the writing medium that was cached by the data storage device of the redundant backup device while the writing medium was being moved to the auxiliary writing device.

29. The system of claim 28, further means for caching new data in the data storage device of the redundant backup device substantially simultaneously to transmitting cached data to the writing medium.

30. A system for backing up information, comprising:

logic configured to transmit data to be backed up to a primary backup device and a redundant backup device;

logic configured to write the transmitted data to a writing medium contained within a writing device of the primary backup device;

logic configured to cache the transmitted data in a data storage device of the redundant backup device simultaneous to writing the transmitted data to the writing medium of the primary backup device such that all data written to the writing medium of the primary backup device is cached in the data storage device of the redundant backup device;

logic configured to interrupt transmission of data to the writing device upon backup operation failure;

logic configured to facilitate remedying of a problem that caused the failure; and logic configured to transmit data previously written to the writing medium.

31. The system of claim 30, wherein the logic configured to facilitate remedying comprises logic configured to automatically replace a first writing medium with a new writing medium, the system further comprising logic configured to transmit the data previously written to the first writing medium to the new writing medium from the data storage device of the redundant storage device.

32. The system of claim 30, wherein the logic configured to facilitate remedying comprises logic configured to facilitate automatic removal of the writing medium, logic configured to facilitate cleaning of the writing device, and logic configured to facilitate automatic replacement of the writing medium, the system further comprising logic configured to resume the transmission of data to the primary backup device.

33. The system of claim 30, wherein the logic configured to facilitate remedying comprises logic configured to facilitate automatic removal of the writing medium from the writing device and logic configured to facilitate automatic placing of the writing medium in an auxiliary writing device, the system further comprising logic configured to transmit data to the writing medium that was cached by the data storage device of the redundant backup device while the writing medium was being moved to the auxiliary writing device.

34. The system of claim 33, further comprising logic configured to cache new data in the data storage device of the redundant backup device substantially simultaneously to transmitting cached data to the writing medium.

35. The system of claim 30, wherein one redundant backup device is provided for each writing device of the primary backup device.

36. The system of claim 35, wherein the redundant backup device and its associated writing device are connected to a common data bus over which the transmitted data travels.

37. A backup system for backing up data, comprising:

a backup server;

a primary backup device comprising a writing device that contains a writing medium;

a data bus that links the backup server to the writing device; and a redundant backup device connected to the backup server and the writing device of the primary backup device via the data bus, the backup device having a data storage device that caches data transmitted from the backup server to the writing device and a bus listening device that controls the data storage device and with which the redundant backup device can receive all data and messages transmitted along the data bus between the backup server and the writing device.

38. A backup system for backing up data, comprising:

a backup server;

a primary backup device comprising a writing device that contains a writing medium; and a redundant backup device connected to the backup server and the writing device of the primary backup device, the backup device having a data storage device that caches data transmitted from the backup server to the writing device and a data directing device that controls the data storage device, wherein the data directing device is provided between the backup server and the primary backup device such that communications from the backup server are intercepted by the data directing device.

39. The system of claim 38, further comprising a data bus that links the backup server to the data directing device.

40. The system of claim 38, further comprising a communications line that links the data directing device to the writing device of the primary backup device.

41. The system of claim 38, further comprising an auxiliary backup device having a writing device containing a writing medium and a communications line that links the data directing device to the writing device of the auxiliary backup device.

42. The system of claim 38, wherein the primary backup device comprises an auxiliary writing device.

43. The system of claim 38, wherein the data storage device is an array of harddisks.

44. The system of claim 38, wherein the primary backup device is a tape library having a plurality of tape drives.

45. The system of claim 38, wherein the data storage device is an array of harddisks.

46. The system of claim 38, wherein the primary backup device is a tape library having a plurality of tape drives.

* * * * *